United States Patent [19]

Hedlund et al.

[11] 4,427,448

[45] Jan. 24, 1984

[54] CORROSION INHIBITING COMPOSITIONS FOR METALS

[75] Inventors: Lenas J. Hedlund; Viswanadham Puligandla, both of Rochester, Minn.

[73] Assignee: International Business Machines Corporation, Armonk, N.Y.

[21] Appl. No.: 385,582

[22] Filed: Jun. 7, 1982

[51] Int. Cl.$^3$ .............................................. C09D 5/10
[52] U.S. Cl. ............................. 106/14.27; 106/14.31; 106/243; 252/34; 252/390; 252/392
[58] Field of Search ................... 106/14.31, 14.37, 14, 106/27, 243; 252/34, 390, 392

[56] References Cited

U.S. PATENT DOCUMENTS

| 2,460,259 | 1/1949 | Kahler et al. | 117/97 |
| 2,580,036 | 12/1951 | Matuszak et al. | 252/51.5 |
| 2,756,156 | 7/1956 | Hiler | 106/14 |
| 3,015,580 | 1/1962 | Zisman et al. | 117/113 |
| 3,220,866 | 11/1965 | Rosenthal | 106/181 |
| 4,130,524 | 12/1978 | Boerwinkle et al. | 260/29.6 |

OTHER PUBLICATIONS

"Advances in Corrosion Science and Technology", vol. 1, pp. 147–228, Plenum Press, 1970.

Primary Examiner—Lorenzo B. Hayes
Attorney, Agent, or Firm—Donald F. Voss

[57] ABSTRACT

An oil-based corrosion inhibitor containing an aliphatic amine, a fatty acid and its ester, and an organotin compound provides improved corrosion resistance to metals and is easily removed when the metals are to be processed.

10 Claims, No Drawings

CORROSION INHIBITING COMPOSITIONS FOR METALS

BACKGROUND OF THE INVENTION

1. Field of the Invention

This invention relates to corrosion inhibiting compositions for metals and more particularly to such compositions for silicon iron and other steels.

2. Description of the Prior Art

Atmospheric corrosion inhibitors offer an excellent method of protecting metallic objects against the aggressive effects of hostile environments without much concern in regard to shape or size of the object to be protected. The method of application is either by spraying the inhibitor onto the surface or immersion of the part in a bath of the inhibitor formulation.

Corrosion protection is offered by partial or complete inhibition of the electrochemical reactions leading to the degradation of the metallic elements. Several excellent corrosion inhibitors are commercially available that can be used on iron and steel parts for general purpose applications. These are usually complex mixtures and may contain one or more trace quantity constituents which are critical to an effective protection.

When materials in different process steps require complete removal of the inhibitor, a knowledge of the composition of the inhibitor formulation is essential for satisfactory removal of the protective film with an appropriate solvent system.

The prior art such as U.S. Pat. No. 4,130,524 does broadly teach the combination of an amine and an acid to form a salt which is a barrier to corrosive elements. However, in the present invention a glycol ester and an organotin compound are included to enhance the action of the acid and amine. Also, the compositions of the present invention are totally homogeneous. The present invention is oil based whereas the compositions of U.S. Pat. No. 4,130,524 are water based. Diffusion through the aqueous base could occur and corrosion could accelerate. Even though the compositions of the present invention are oil based, they are easily removed using commercial solvents such as methyl chloroform.

SUMMARY OF THE INVENTION

The principal objects of the invention are to provide improved corrosion inhibiting compositions which provide the desired protection of silicon iron and other steels, are soluble in a nonpolar carrier matrix where the matrix includes a solvent used in the removal of the corrosion inhibiting compositions and are easily removable.

The foregoing objects are achieved by combing 9-octadecenoic acid with dodecyl amine, dibutyltin dilaurate and ethyleneglycol monooleate in a solvent matrix including methylchloroform, petroleum mineral oil and kerosene. The acid is in excess of the amine so as to enable the amine to go into solution. The glycol ester and the organotin compound enhance the action of the acid and amine in forming a physical barrier to corrosive elements. The corrosion inhibiting compositions are easily removed by vapor degreasing using methyl chloroform as the solvent.

DETAILED DESCRIPTION OF THE INVENTION

The corrosion inhibiting compositions of the present invention include an acid and an amine. The acid is an organic fatty acid and the amine is an aliphatic primary amine. An organotin compound and a glycol ester are also included in the compositions to enhance the corrosion inhibiting effect. The amine and acid are mixed together and are added to the oil based carrier followed by the addition of the organotin compound and the glycol ester. The oil based carrier contains methyl chloroform and a petroleum kerosene as solubility and viscosity modifiers. The composition is applied to a substrate by immersion or spraying such that complete and uniform coating on the substrate is obtained.

The substrates examined with the compositions of this invention include silicon-iron and other ferrous alloys, e.g. iron, steel, etc. The substrates coated with the composition of this invention were subjected to temperature and humidity testing and standard salt spray testing. The degree of corrosion is evaluated by optical examination under a microscope.

The compositions of this invention have been found to provide effective corrosion protection to metallic substrates such as ferrous steels.

The invention is further illustrated by the following examples where Example 4 represents the preferred formulation for the invention. Example 1 is included for the purpose of showing that without the amine in the formulation, corrosion will develop when a treated specimen is subjected to a salt spray test. In Example 2 the formulation includes both an acid and amine but not the enhancement additives. Example 3 is somewhat similar to Example 2 in that the enhancement additives are not included but the amine is in molar excess. In Example 4 the acid is in excess and the amine is included together with the enhancement additives.

EXAMPLE 1

A corrosion inhibiting formulation is made by mixing 10 ul each of 9-octadecenoic acid, dibutyltin dilaurate and ehtylene glycol monooleate into five milliliters of oil based carrier matrix consisting of paraffin oil, kerosene and methyl chloroform in the ratio of 7:2:1 by volume.

The formulation is applied to 7 mm long cylindrical specimens of silicon-iron alloy by immersion. After ascertaining uniform coverage the specimens are taken out, mounted on nonmetallic supports and transferred to a temperature and humidity chamber set at 70° C. and 70% relative humidity. The alloy showed no visible corrosion for 20 days. Untreated samples showed visible corrosion in five hours.

More test specimens were treated with the composition and were subjected to standard salt-spray test (ASTM B117-73). Visible corrosion was evident in two hours.

EXAMPLE 2

A corrosion inhibiting formulation is made by mixing 0.38 g of 9-octadecenoic acid and 0.12 g of dodecylamine and 3 ml of oil based carrier matrix consisting of paraffin oil, kerosene and methyl chloroform in the ratio 7:2:1 by volume.

The formulation is applied to the specimens as described in Example 1 and the specimens are subjected to the standard salt-spray test (ASTM B117-73).

No visible corrosion was evident up to 7.5 hours and very slight corrosion was apparent after 22 hours. Thus, a combination of acid and amine offers a superior protection.

EXAMPLE 3

A corrosion inhibiting formulation is made by mixing 0.19 g of 9-octadecenoic acid, 0.25 g of dodecyl amine, 2.1 ml methyl chloroform, 0.7 ml paraffin oil, 0.2 ml of kerosene.

The formulation is applied to the specimens as described in Example 1 and the specimens are subjected to the standard salt-spray test (ASTM B117-73).

Visible corrosion was apparent in 1.3 hours. Thus, it is seen that for an effective protection an acid to amine ratio of 1:1 or greater is to be present.

EXAMPLE 4

A corrosion inhibiting formulation is made by mixing 0.06 g of dodecylamine, 0.16 g dibutyltindilaurate, 0.16 g ehtylene glycol monooleate, 0.19 g 9-octadecenoic acid is mixed with 3 ml of paraffin based carrier mixture.

The formulation is applied to the specimens as described in Example 1 and the specimens are subjected to the standard salt spray test.

Visible corrosion was evident only after 45 hours of exposure in the salt spray environment.

We claim:

1. A corrosion inhibitor comprising:
   an amine of the family of aliphatic primary amines where the amine is in the range of 1 to 3 weight percent, with 12 carbons or less in chain length, and is sparingly soluble in oil,
   an acid of the family of aliphatic carboxylic acids where the acid is in the 2 to 6 weight percent range and with a 16 to 20 carbon chain, and,
   an oil based carrier consisting of a paraffinic oil, kerosene and methyl chloroform for said acid and amine, said acid being in a molar excess to result in a homogeneous composition.

2. The corrosion inhibitor of claim 1, where said amine is dodecyl amine.

3. The corrosion inhibitor of claim 2 where the weight percent of said dodecyl amine is about 3 percent.

4. The corrosion inhibitor of claim 1 where said acid is 9-octadecenoic acid.

5. The corrosion inhibitor of claim 1 where the composition of said oil based carrier by volume is oil-70%, kerosene-20%, methyl chloroform-10%.

6. The corrosion inhibitor of claim 1 further comprising:
   an organotin diester and a monoester of said acid and a diol.

7. The corrosion inhibitor of claim 6 where said organotin diester is dibutyltin dilaurate and is about 4.5 weight percent.

8. The corrosion inhibitor of claim 6 where said monoester is ethylene glycol monooleate and is about 4.5 weight percent.

9. The corrosion inhibitor of claim 1 where said acid is an oil soluble aliphatic carboxlyic acid.

10. The corrosion inhibitor of claim 1 where the aliphatic portion of said acid is unsaturated.

* * * * *